US006999273B2

(12) United States Patent
Tsang et al.

(10) Patent No.: US 6,999,273 B2
(45) Date of Patent: Feb. 14, 2006

(54) FILTER ASSEMBLY FOR A DATA STORAGE DEVICE

(75) Inventors: Alan H Tsang, Bloomington, MN (US); Rollo R Cain, Burnsville, MN (US); James E Kaneko, Oakdale, MN (US); Daniel L. Tuma, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 187 days.

(21) Appl. No.: 10/147,297

(22) Filed: May 15, 2002

(65) Prior Publication Data

US 2003/0151847 A1  Aug. 14, 2003

Related U.S. Application Data

(60) Provisional application No. 60/356,707, filed on Feb. 13, 2002, provisional application No. 60/356,708, filed on Feb. 13, 2002, provisional application No. 60/356,709, filed on Feb. 13, 2002, provisional application No. 60/356,710, filed on Feb. 13, 2002.

(51) Int. Cl.
 *G11B 33/14* (2006.01)
(52) U.S. Cl. ............... 360/97.02; 360/97.03
(58) Field of Classification Search ............ 360/97.01, 360/97.02, 97.03, 97.04
See application file for complete search history.

(56) References Cited

U.S. PATENT DOCUMENTS

| 5,140,578 | A | * | 8/1992 | Tohkairin ............. 369/75.2 |
|---|---|---|---|---|
| 5,307,222 | A | * | 4/1994 | Dion .................. 360/97.02 |
| 5,898,545 | A | | 4/1999 | Schirle |
| 6,008,966 | A | | 12/1999 | Forbord et al. |
| 6,097,568 | A | | 8/2000 | Ekhoff |
| 6,208,484 | B1 | * | 3/2001 | Voights ............... 360/97.02 |
| 6,238,467 | B1 | | 5/2001 | Azarian |
| 6,261,979 | B1 | | 7/2001 | Tanaka et al. |
| 6,266,208 | B1 | | 7/2001 | Voights |
| 6,296,691 | B1 | | 10/2001 | Gidumal |
| 6,337,782 | B1 | | 1/2002 | Guerin et al. |
| 6,395,073 | B1 | * | 5/2002 | Dauber ................. 96/134 |
| 6,709,498 | B1 | * | 3/2004 | Tuma .................. 96/134 |
| 2003/0156351 | A1 | * | 8/2003 | Voights et al. ......... 360/97.02 |
| 2003/0156352 | A1 | * | 8/2003 | Voights et al. ......... 360/97.02 |

* cited by examiner

*Primary Examiner*—William J Klimowicz
(74) *Attorney, Agent, or Firm*—Westman, Champlin & Kelly, P.A.

(57) ABSTRACT

A filter assembly for a data storage device. The filter assembly includes a flow passage having an inlet and outlet to provide a recirculating filter. The filter assembly is positioned to provide a pressure differential between the inlet and outlet of the flow passage. A breather filter includes an opening for ambient air exchange through a second flow passage which is opened to the pressure differential of the flow passage of the recirculating filter to enhance ambient air exchange. An air dam assembly interposed in an air flow path provides a high pressure region and low pressure region. An assembly structure includes an air dam and a filter flow passage to enhance the pressure differential across the flow passage. Flow turbulence through the flow passage is reduced via flow plates supported between raised edge portions of the flow passage.

18 Claims, 12 Drawing Sheets

FIG. 18

FILTER ASSEMBLY FOR A DATA STORAGE DEVICE

CROSS-REFERENCE TO RELATED APPLICATION

This application claims priority from U.S. Provisional Application Ser. No. 60/356,707 filed on Feb. 13, 2002 entitled "MAXIMIZING THE EFFICIENCY OF THE RECIRCULATING AND BREATHER FILTER COMBINATION"; U.S. Provisional Application Ser. No. 60/356,708 filed on Feb. 13, 2002 entitled "IMPROVING BREATHER FILTER EFFICIENCY"; U.S. Provisional Application Ser. No. 60/356,709 filed on Feb. 13, 2002 entitled "IMPROVING THE AIR FLOW FOR BETTER FILTRATION" and U.S. Provisional Application Ser. No. 60/356,710 filed on Feb. 13, 2002 entitled "CONTROLLING AIR FLOW OFF A SPINNING DISC".

FIELD OF THE INVENTION

The present invention relates generally to data storage devices, and more particularly but not by limitation to air flow assembly components therefor.

BACKGROUND OF THE INVENTION

Data storage devices store digital information on a rotating disc. Heads are supported relative to the disc surface to read data from or write data to the disc. For proximity or near proximity recording the head includes an air bearing slider supporting transducer elements for read/write operations. Rotation of the disc creates an air flow along an air bearing surface of the slider for hydrodynamic operation. Perturbances or turbulence in the air flow along the slider can induce vibrational motion to the slider or head. Vibration or resonance of the slider or head can interfere with read/write operation or introduce off-track motion to the head. Debris can also interfere with read/write operations and can increase head disc contact. Areal disc drive density is increasing and thus there is an effort to remove debris or reduce particulate contamination in data storage devices.

Within one data storage device, a number of separate filters may be found. For example, recirculation filters are used to remove debris within the data storage device. Breather filters refer to filters used to filter air that enters the data storage device from outside of the data storage device.

The push for smaller form factors and efforts towards reducing manufacturing complexity have resulted in proposals to provide integrated filters. For example, by proposing the use of one assembly housing that holds both a recirculation filter and a breather filter. However, such assemblies are often bulky or awkward to assemble to the data storage device, and often requires special modifications to the base chassis, which may counteract other efforts to allow for greater flexibility in the manufacture of data storage devices. The difficulty in designing filters for use within a compact and crowded environment as that found within a data storage device is further compounded by the need to consider the efficiency of the filters. For example, the breather filter is often located located as close as possible to the base chassis so as to faciliate ambient air exchange. Such considerations may tend to limit the placement of the breather filter in the data storage device.

Embodiments of the present invention provide solutions to these and other problems, and offer other advantages over the prior art.

SUMMARY OF THE INVENTION

The present invention relates to a filter assembly for a data storage device. The filter assembly includes a flow passage having an inlet and outlet to provide a recirculating filter. The filter assembly is positioned to provide a pressure differential between the inlet and outlet of the flow passage. A breather filter includes an opening for ambient air exchange through a second flow passage which is opened to the pressure differential of the flow passage of the recirculating filter to enhance ambient air exchange. An air dam assembly interposed in an air flow path provides a high pressure region and low pressure region. An assembly structure includes an air dam and a filter flow passage to enhance the pressure differential across the flow passage. Flow turbulence through the flow passage is reduced via flow plates supported between raised edge portions of the flow passage.

The present invention provides an integrated filter that is able to perform with improved efficiency without the need to take up additional valuable space within a data storage device. These and other features and benefits that characterize embodiments of the present invention will be apparent upon reading the following detailed description and review of the associated drawings.

DETAILED DESCRIPTION OF ILLUSTRATIVE EMBODIMENTS

Figure 1:
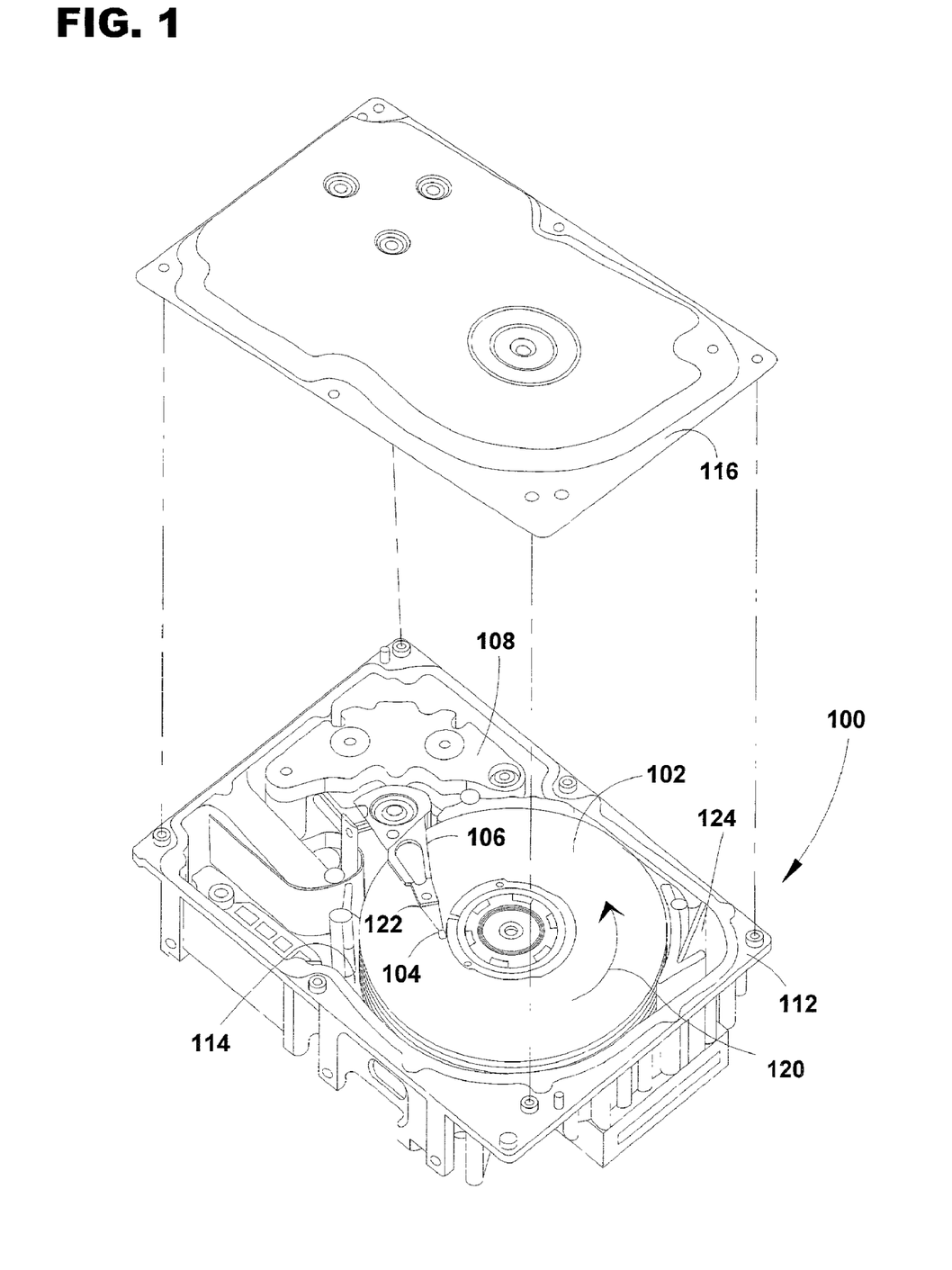
FIG. 1 is a perspective illustration of an embodiment of a data storage device with the cover exploded.

FIG. 1 is a perspective illustration of a data storage device 100 in which digital information is stored on a plurality of discs 102 (or single disc 102). Heads 104 are positioned relative to the disc surface to read data from or write data to the disc 102. In the embodiment shown, heads 104 are coupled to an actuator assembly 106 which is powered by a voice coil motor 108 to position heads relative to selected data tracks on the disc surface. Heads 104 include an air bearing slider having transducer elements carried thereby for read/write operations. Transducer elements include for example, inductive, magnetoresistive or magneto-optical transducer elements. Components of the disc drive are supported relative to a base chassis 112 which has a recessed portion 114 closed by cover 116 to form a chamber of the data storage device.

For operation, rotation of the discs 102 by a spindle motor (not shown) creates an air flow as illustrated by arrow 120. Air flows along the air bearing slider to create a hydrodynamic lifting force for read/write operations. The air bearing slider is coupled to a suspension assembly 122 and is positioned relative to the disc surface. Debris in the data storage device can increase head/disc contact and/or interfere with read/write operations. Data storage devices include filters 124 as illustrated schematically in the chamber to filter or remove debris to limit interference with read/write operations. Filters are positioned about an outer circumference of the discs to filter air along the air flow path. Efficiency of the filtering process for removing debris is based in part on the flow rate of air or medium through the filter.

Figure 2:
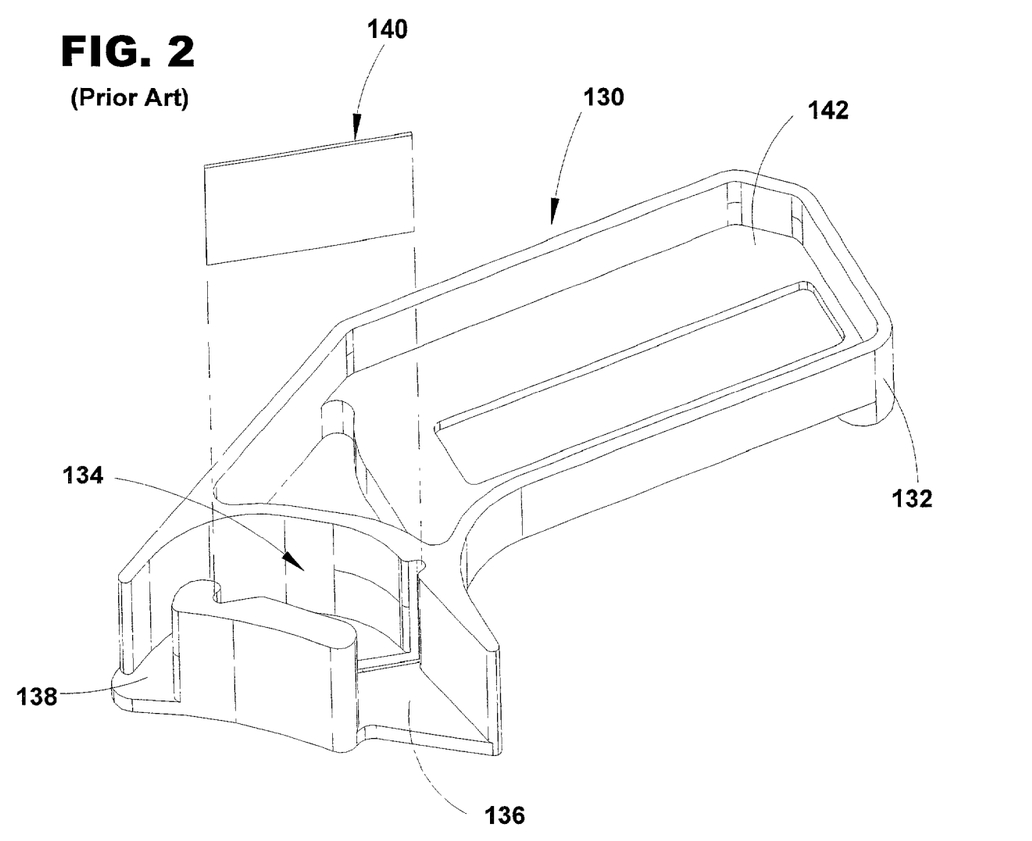
FIG. 2 is an embodiment of a filter desiccant chamber assembly.

FIG. 2 illustrates an embodiment of an assembly device 130 including a filter portion for assembly in the chamber of the data storage device. The device 130 includes a body 132 having a flow passage 134 formed therein. The flow passage 134 includes an inlet 136 and an outlet 138 and a passage length therebetween. A filter or filter pad 140 is supported in the flow path between inlet 136 and outlet 138 to filter debris. The device also includes a desiccant chamber portion 142 to form a composite assembly device for installation in the chamber of a data storage device. The assembly device of FIG. 2 is assembled proximate to an edge of the disc 102 so that the inlet 136 is proximate to a high pressure region and the outlet is spaced therefrom to provide a pressure differential between the inlet 136 and the outlet 138 to enhance flow through the filter or pad 140 supported in the flow passage 134 between the inlet and the outlet.

Figure 3:
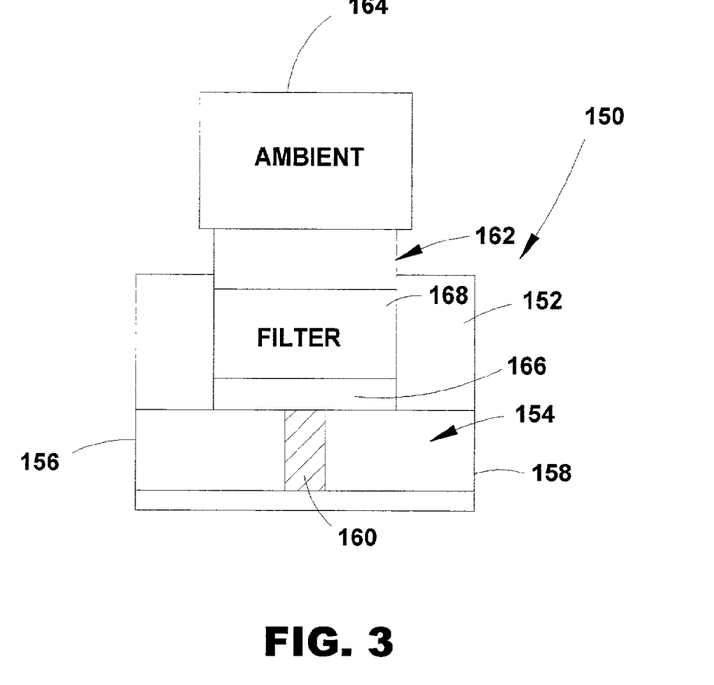
FIG. 3 is a schematic illustration of an embodiment of an assembly including a breather filter opened to a filter passage for ambient air exchange.

FIG. 3 schematically illustrates an embodiment of a composite assembly 150 incorporating a breather filter. As shown, the assembly 150 includes an assembly body 152 having a first flow passage 154 having an inlet 156 and outlet 158 and passage length therebetween. The inlet 156 is positioned in the drive chamber proximate to a high pressure region to provide a pressure differential between the inlet 156 and a lower pressure area proximate to outlet 158 spaced therefrom. The flow passage 154 includes a narrowing portion between the inlet 156 and outlet 158. A filter or filter pad 160 illustrated schematically is disposed in the flow passage 154 for filtering debris. Preferably, the filter or filter pad 160 occupies a relatively short length of the flow passage so as to facilitate air flow through the flow passage 154.

As shown, the assembly 150 includes a second flow passage 162 illustrated schematically opened to ambient as illustrated by block 164 and opened to an intermediate portion of the first flow passage 154 between inlet 156 and outlet 158 as schematically illustrated at 166. A filter 168 is interposed in the second flow passage 162 to form a breather filter for ambient air exchange. The second flow passage 162 is opened to the intermediate portion of the first flow passage 154. A pressure differential between the inlet 156 and the outlet 159 is exploited to facilitate formation of a lower pressure at the intermediate portion relative to ambient which thereby enhances ambient air exchange through the filter 168.

Rotation of the disc creates an area of high pressure proximate to an outer circumference of the disc. The flow passage of the recirculating filter is positioned proximate to the high pressure region to increase flow through the recirculating filter. In the composite assembly 150 described, the first flow passage 154 of the recirculating filter provides a low pressure area relative to ambient and the ambient air exchange passage 162 is opened to a low pressure area of the assembly. The flow passage 154 includes a constricted or narrow portion between the inlet and outlet to provide a venturi effect to increase flow velocity therethrough. One is not constrainted to position the breather filter immediately adjacent to or as close as possible to the base chassis, thereby providing for greater flexibility in the design of the base chassis. As shown, the breather filter may be located to one side of the recirculating filter, and not necessarily below the recirculating filter. This allows the recirculating filter to more effectively cater to air flow nearer to the base chassis. Neither is one constrainted to place the breather filter where there may be lower pressure regions in the data storage device. In addition, the composite assembly can be installed in the data storage device as a unit to reduce manufacturing complexity.

Figure 4:
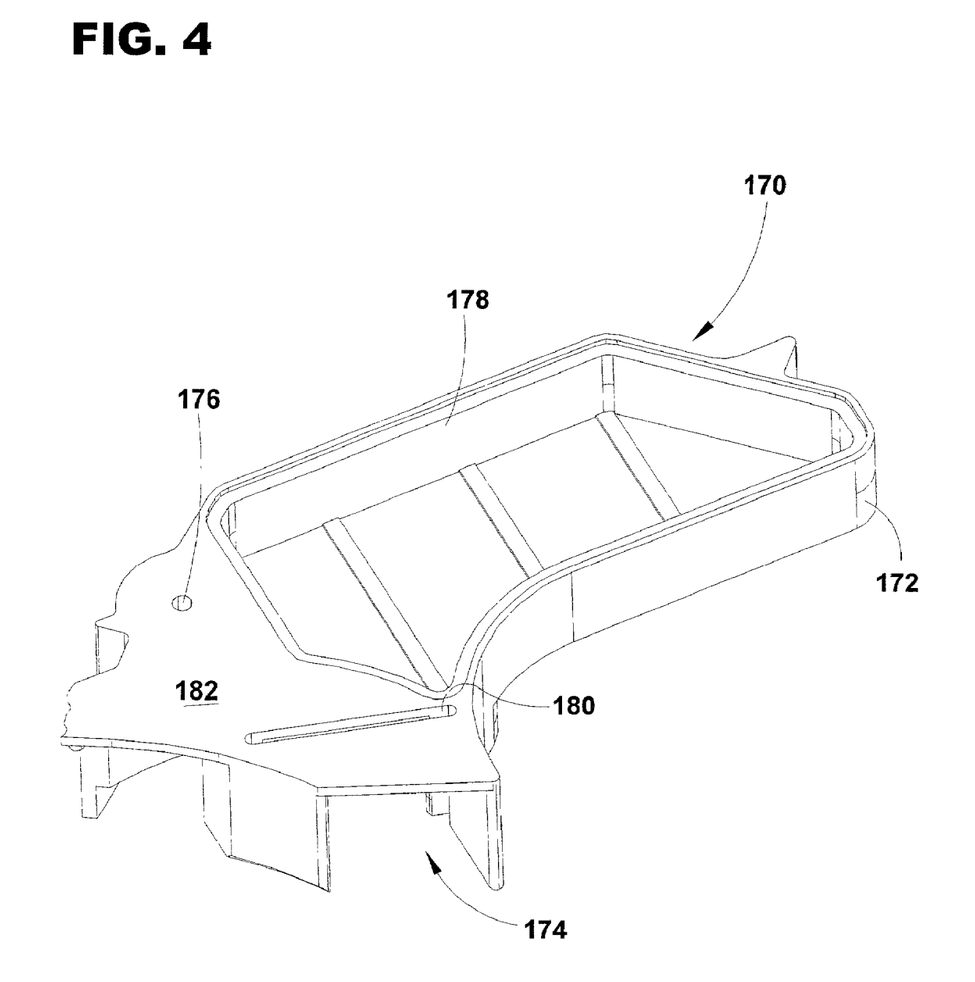
FIG. 4 is a perspective illustration of an embodiment an assembly including a filter portion and a desiccant chamber portion as viewed from a first orientation.
Figure 5:
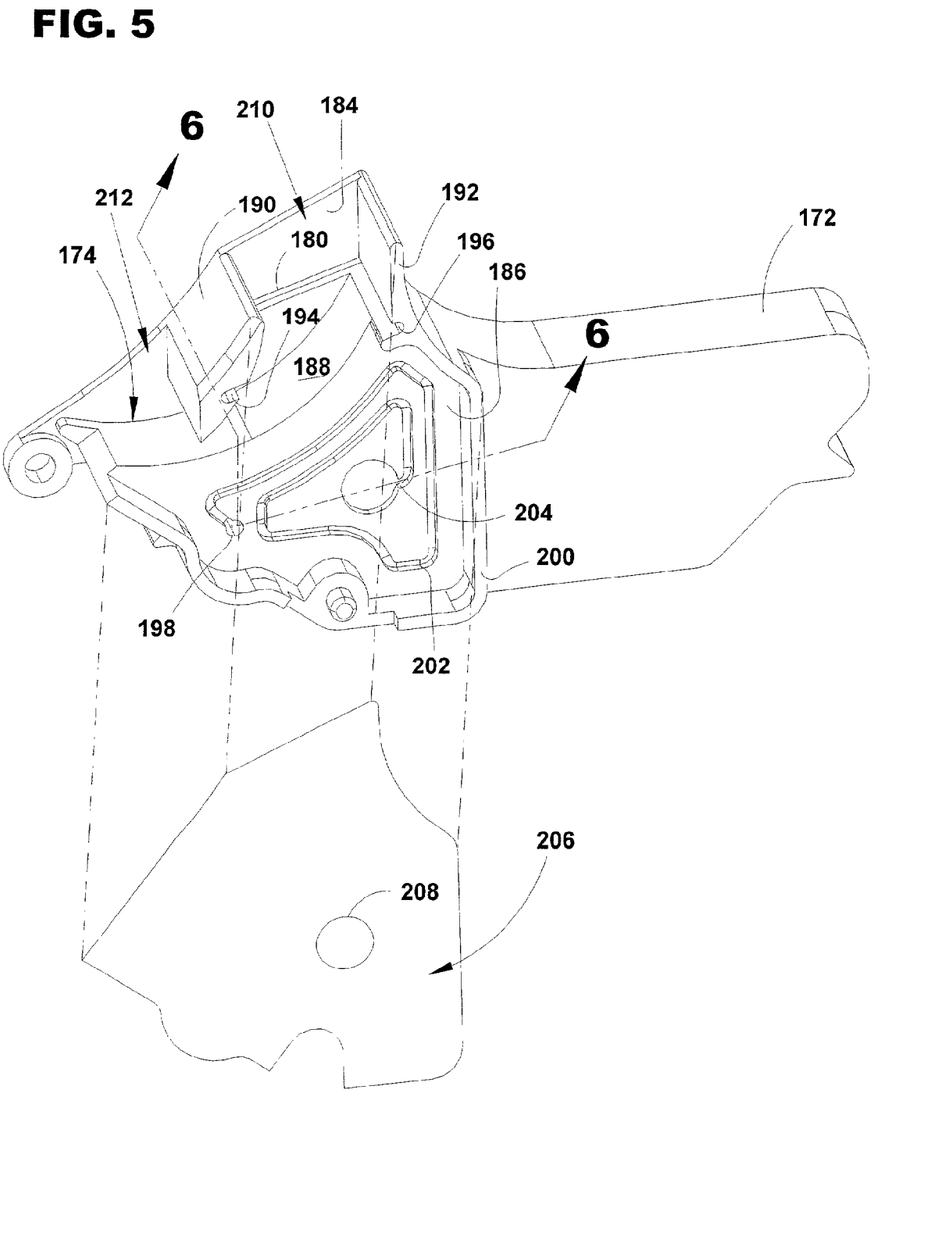
FIG. 5 is a perspective illustration of the embodiment of FIG. 4 viewed from a second orientation.
Figure 6:
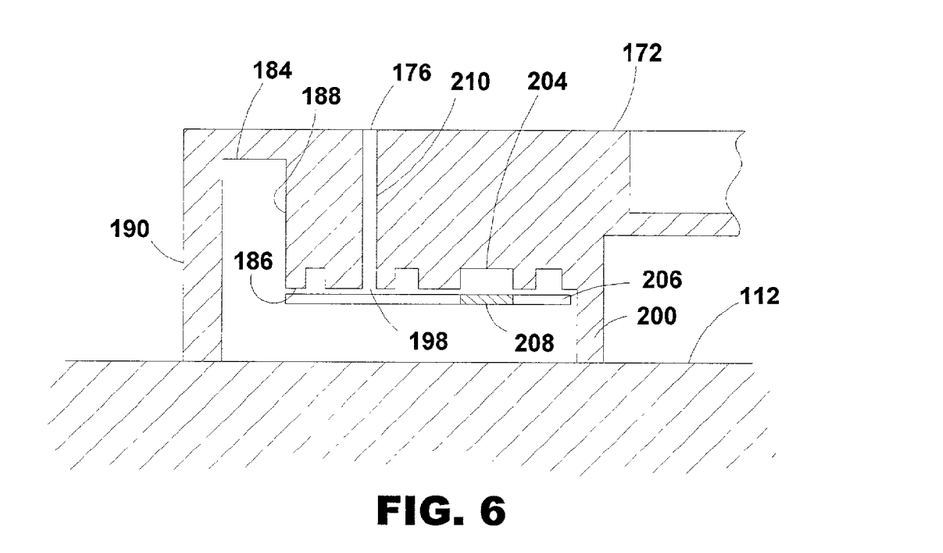
FIG. 6 is a cross-sectional view taken along lines 6—6 of FIG. 5.

FIGS. 4–6 illustrate an embodiment of composite assembly 170 including a recirculating filter and breather filter as previously described. As shown, the assembly includes a molded assembly body 172 having a first flow passage 174, an ambient air exchange opening 176 and a desiccant chamber portion 178. As shown assembly body 172 includes transverse slot 180 on a body surface 182 to support a filter or filter pad in the flow passage 174. As illustrated in FIG. 5, the assembly body 172 includes a recessed region 184, a stepped region 186 and a curved surface step 188 between the recessed region 184 and the stepped region 186. The first flow passage 174 is formed along the recessed region 184 in part by the curved surface step 188 and opposed raised edge portions 190, 192 on the recessed region 186 which form a boundary of the flow passage 174. As shown edge portions 190, 192 on the recessed region 184 include longitudinal slots 194, 196 aligned with the transverse slot 180 to support a filter pad (not shown) in the flow passage to form the recirculating filter as previously described.

As shown in FIG. 5, the stepped region 186 includes an opening 198 on a stepped surface and a raised rail 200 extending therefrom to form a raised edge portion about the stepped region 186. In the particular embodiment illustrated, a labyrinth 202 is formed between the opening 198 and a well portion 204 on the surface of the stepped region 186. As shown in phantom in FIG. 5, a filter partition 206 including a filter portion 208 abuts the stepped surface to form a flow passage along labyrinth 202 and a filter portion interposed between the ambient air exchange opening 176 and flow passage 174 to form the breather filter. As shown, flow passage 174 include a constricted passage area between inlet 210 and outlet 212 as shown in FIG. 5 to provide a venturi effect to increase air flow velocity for increased recirculating and breather filter efficiency.

As shown in the cross-sectional view of FIG. 6, the assembly body includes a channel 210 between the ambient air exchange opening 176 and opening 198 on the stepped surface to form a portion of the second flow passage and in the illustrated embodiment another portion of the second flow passage is formed along labyrinth 202 to the well portion 204. As shown, the filter portion 208 is aligned with well portion 204 to provide a filter for ambient air exchange.

For assembly, raised edge portions 190, 192 of the flow passage 174 and raised rail 200 about the stepped region 186 abut a surface of the chassis 112 and the stepped surface is spaced therefrom to form an intermediate space opened to the second flow passage through filter portion 208 and opened to an intermediate portion of the first flow passage between the inlet and outlet at the curved surface step 188 defining a recessed boundary (i.e. spaced from a raised surface of the raised edge portions 190, 192) of the flow passage along an intermediate portion thereof.

Thus, as described, the second flow passage is opened to the first flow passage to utilize a pressure differential thereacross for ambient air exchange. Ambient air is exchanged through the filter portion 208 generally normal to the flow passage 174 which provide a low pressure region spaced from the ambient air exchange opening 176. In the particular embodiment illustrated, ambient air is filtered through the recirculating filter pad (not shown), although application is not limited to passage through the recirculating filter pad disposed in slots 194, 196. Thus the composite assembly described provides an integrated construction which can be assembled in a data storage device without complex assembly steps.

Figure 7:
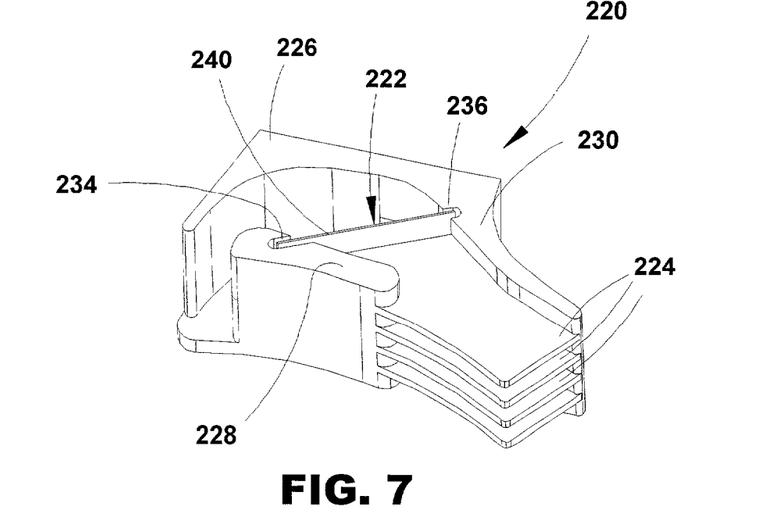
FIG. 7 is a perspective illustrations of a filter passage having flow plates therein.

FIG. 7 illustrates an embodiment of an assembly 220 including a flow passage 222 having a plurality of flow plates 224 disposed therein for streamline flow. The assembly includes an assembly body 226 having raised edge portions 228, 230 forming the flow passage 222. The raised edge portions 228, 230 include slots 234, 236 to support a filter or pad 240. As shown, the flow passage 222 includes a plurality of flow plates 224 spaced to align with discs of a disc stack. The flow plates 224 are coupled to and extend from the raised edges portions 228, 230 to form flow fins aligned with edges of the disc surface to reduce flow turbulence through the flow passage 224 to enhance flow and filter efficiency as cooperatively illustrated in FIGS. 8–9.

Figure 8:
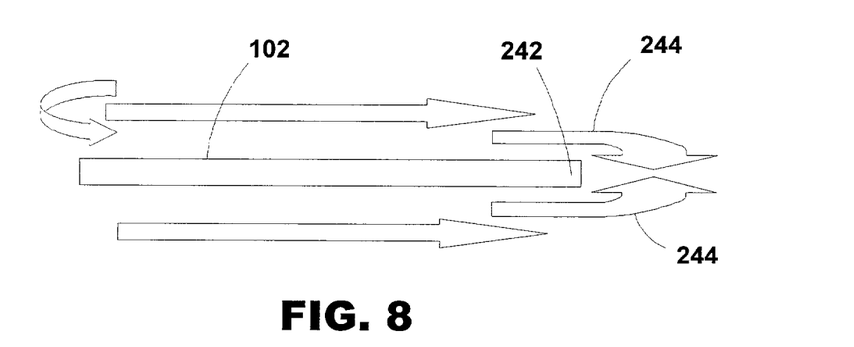
FIGS. 8–9 comparatively illustrate flow contours at an edge or boundary of a disc.
Figure 9:
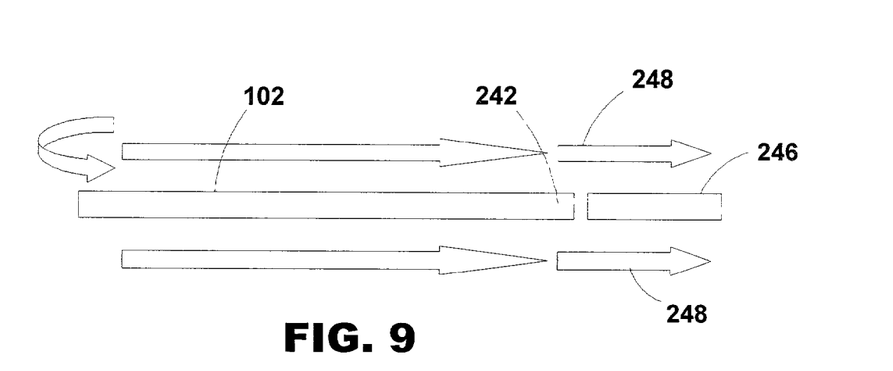

As shown in FIG. 8, flow contour shifts proximate to an outer edge 242 of a disc surface 102 increases the propensity for flow turbulence as illustrated by arrows 244. As comparatively illustrated in FIG. 9, fins 246 aligned at the edge 242 of a disc 102 modifies the flow contour to reduce flow turbulence proximate to the edge of the disc to provide a more laminar flow as illustrated by arrows 248. The composite assembly 220 as illustrated in FIG. 7 includes flow plates 224 in the flow passage 222 to provide a streamline flow path to enhance flow through the flow passage of the filter assembly. Although a particular number of flow plates is shown application is not limited to the particular number of flow plates shown.

Figure 10:
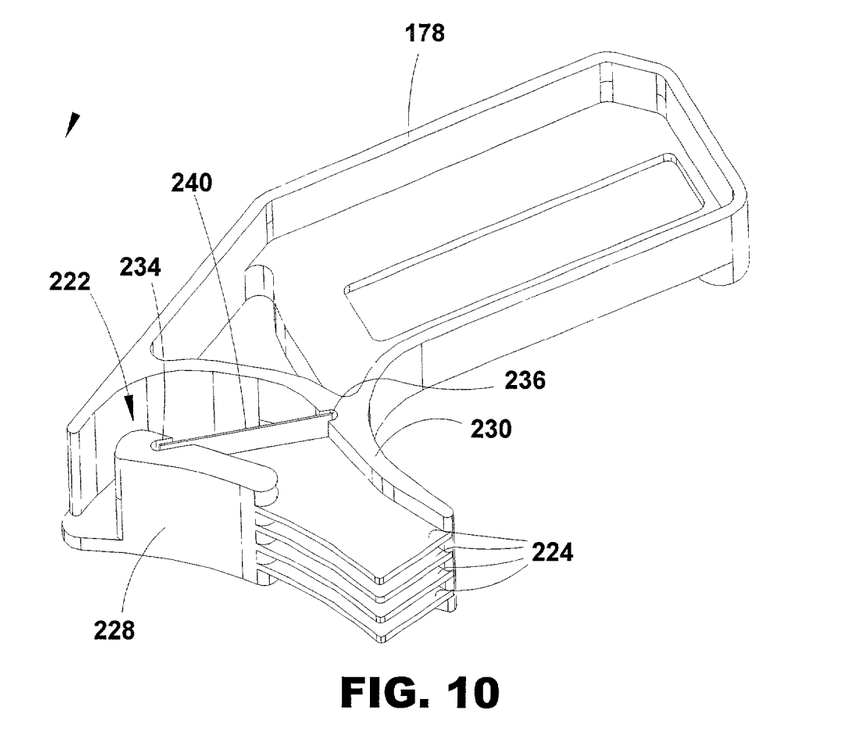
FIG. 10 is a perspective illustration of an embodiment of an assembly including a filter passage having flow plates therein and a desiccant chamber.
Figure 11:
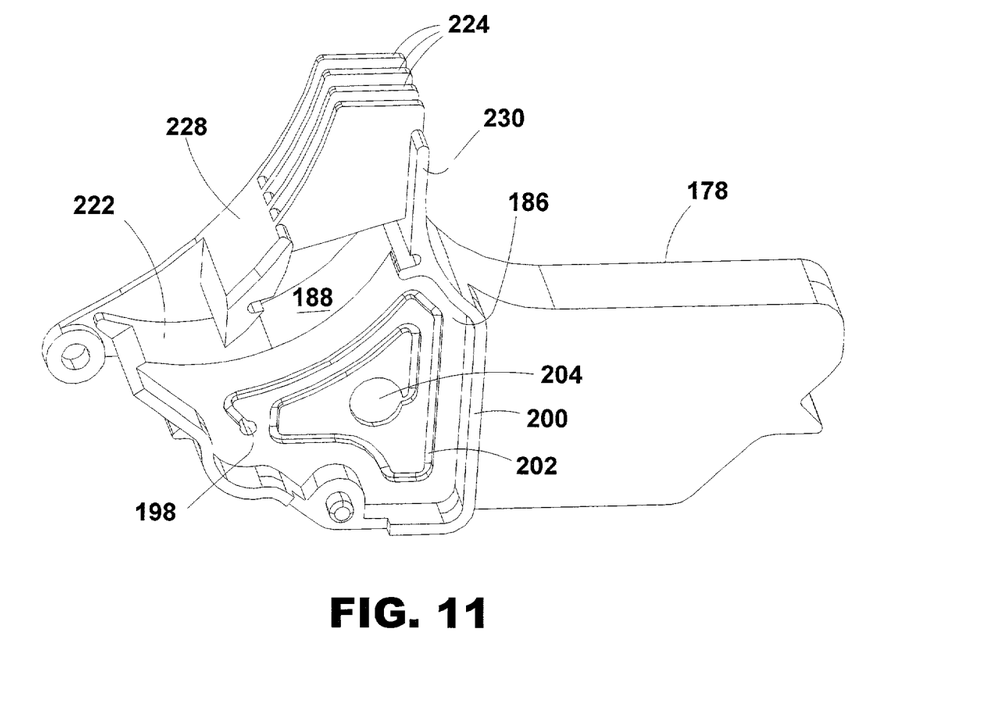
FIG. 11 is a perspective illustration of an embodiment of a filter assembly including a breather filter opened to a filter passage for ambient air exchange.

FIGS. 10–11 illustrate alternate assembly embodiments where like numbers are used to refer to like parts in FIG. 8.

In the embodiment shown in FIG. 10, the assembly body includes a desiccant chamber portion 178 to form an integral assembly. In the embodiment illustrated in FIG. 11, the assembly body includes a breather filter portion. The structure of the breather filter portion shown is similar to that illustrated in FIGS. 4–6 and includes a second flow passage opened to an intermediate portion of the first flow passage including the plurality of flow plates 224 therein.

Figure 12:
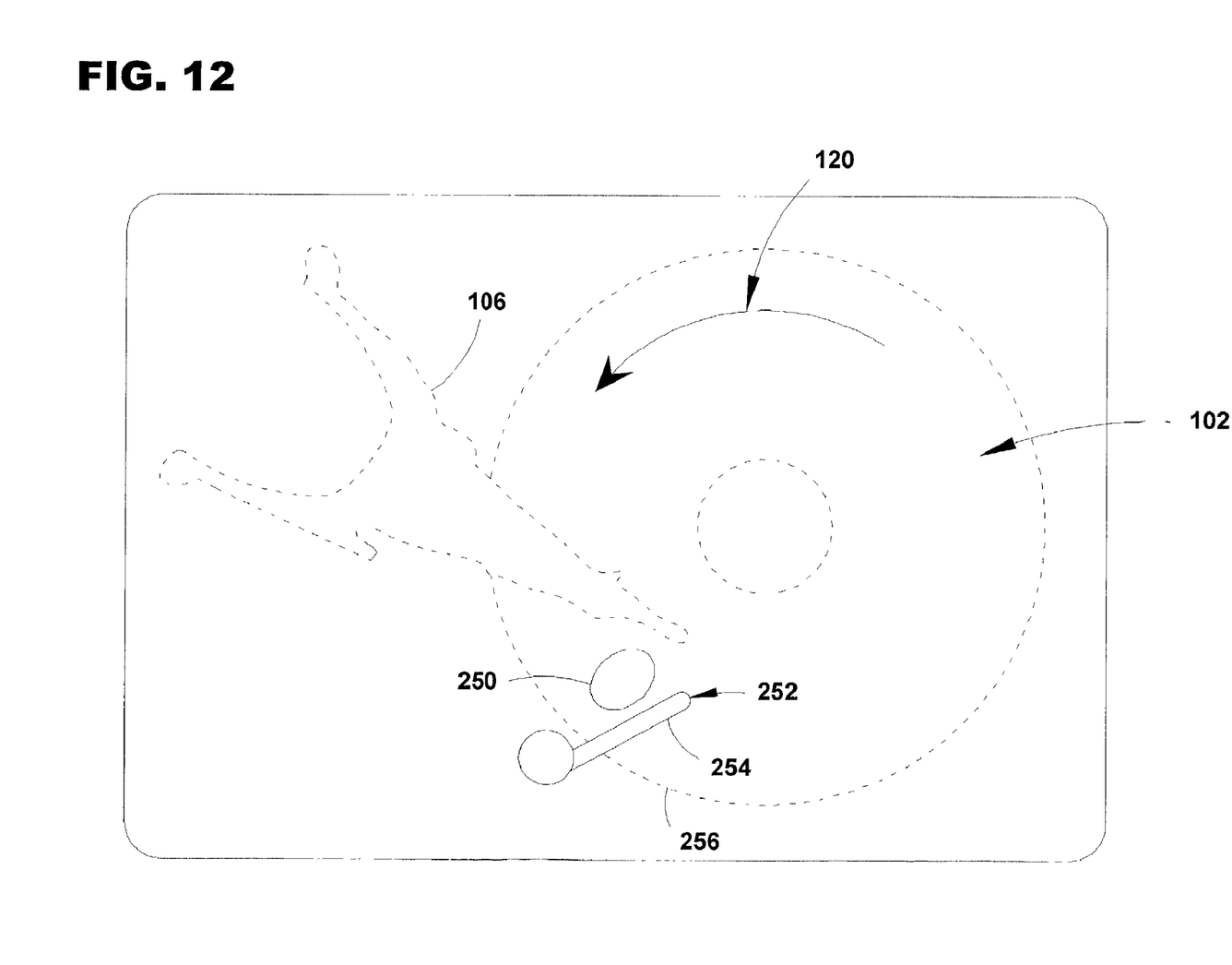
FIG. 12 is a plan view of a data storage device including an air dam.

As previously described, air flows along a flow path via rotation of the discs as illustrated by arrow 120. Flow is constricted along the flow path proximate to the actuator assembly 106 as illustrated in FIG. 12. Constriction of the air flow along the flow path tends to produce a region 250 having increased turbulence or velocity. Increased turbulence or velocity tends to increase vibration of the head. To reduce flow energy or velocity proximate to region 250, an air dam 252 is interposed in the flow path to restrict flow along the flow path downstream of the actuator assembly 106. The air dam 252 is supported proximate to the disc and includes a finger portion 254 extending inwardly from an outer edge 256 of the disc to restrict flow to reduce vibration and instability.

Figure 13:
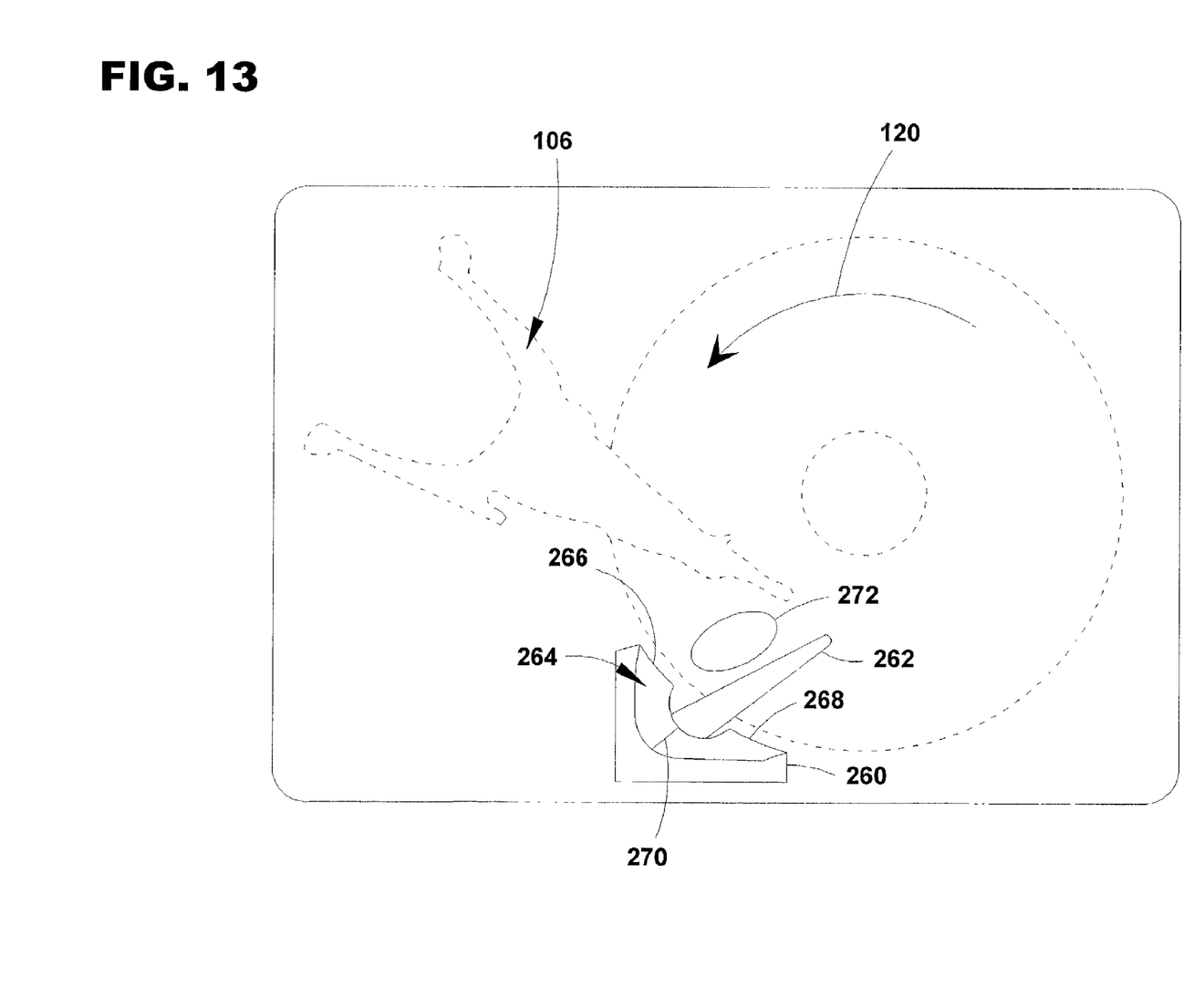
FIG. 13 is a plan view of a data storage device including an air dam and filter or flow passage thereabout.

FIG. 13 illustrates an embodiment of an assembly including an assembly body 260 having an air dam portion including fingers 262 extending therefrom and a flow passage 264 having an inlet 266 and an outlet 268 and a filter or pad 270 disposed in the flow passage 264 between the inlet 266 and the outlet 268. As shown fingers 262 are interposed in the flow path 120 to dissipate or slow flow velocity. Fingers create a high pressure region 272 upstream of the finger 262. The inlet 266 of the flow passage is positioned upstream of the finger proximate to the high pressure region 272.

The flow passage 264 is curved to position the outlet 268 proximate to a lower pressure region downstream of the finger 262 and to provide a sufficient passage length therefor. Thus, the flow passage provides a flow path around the finger which uses the pressure differential across the finger to enhance filter efficiency or flow through the filter passage. In one embodiment, flow passage 264 narrows towards outlet 268 to provide a venturi effect therealong to increase flow velocity through the flow passage.

Figure 14:
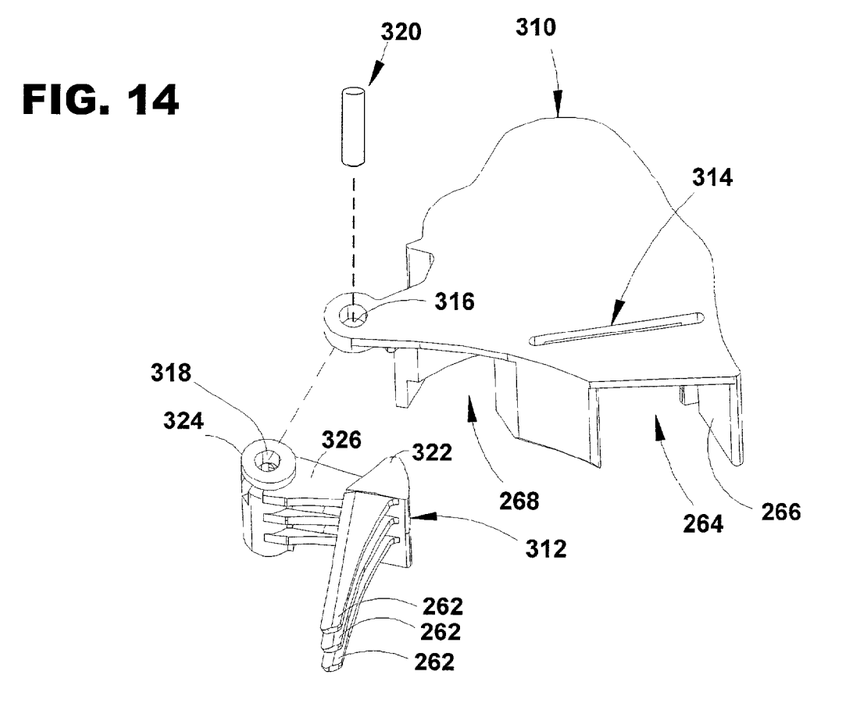
FIG. 14 illustrates an embodiment of an assembly structure including a filter or flow passage and an air dam.
Figure 15:
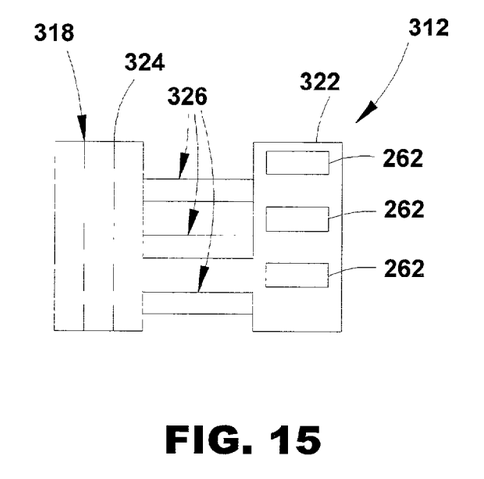
FIG. 15 is an elevational illustration of an embodiment of an assembly body for an air dam.

FIGS. 14–15 illustrates an embodiment of an assembly structure including an air dam body and a filter body where like numbers are used to refer to like parts in FIG. 13. As shown, the assembly structure includes assembly bodies 310, 312. Assembly or filter body 310 includes flow passage 264 having an inlet 266 and contoured outlet 268 and slot 314 to support a filter. Assembly or air dam body 312 is contoured to mate with body 310 and includes a plurality of spaced fingers 262 extending therefrom to cooperatively form an air dam structure for a plurality of discs. As illustrated, assembly body 310 includes an opening 316 and assembly body 312 includes opening 318. Bodies 310, 312 are coupleable through openings 316 and 318 on the assembly bodies 310, 312 and are coupleable to a chassis 112 via a fastener assembly 320 as illustrated schematically.

Assembly body 312 includes first and second body portions 322 and 324. Body portion 322 includes the plurality of fingers 262 extending therefrom and body portion 324 includes the opening 318 therein. A plurality of spaced slats 326 extend between the first and second body portions 322, 324. As shown in FIG. 15, the slats 326 are staggered relative to the fingers 262 so that the slats 326 align with the disc thickness to form fins proximate to the outlet 268 of the flow passage 264. Body 312 nests proximate to the outlet 268 so that slates 326 extend thereacross to form fins aligned with the discs and flow openings therebetween to provide a streamlined flow transition at the outlet of the flow passage 264.

Figure 16:
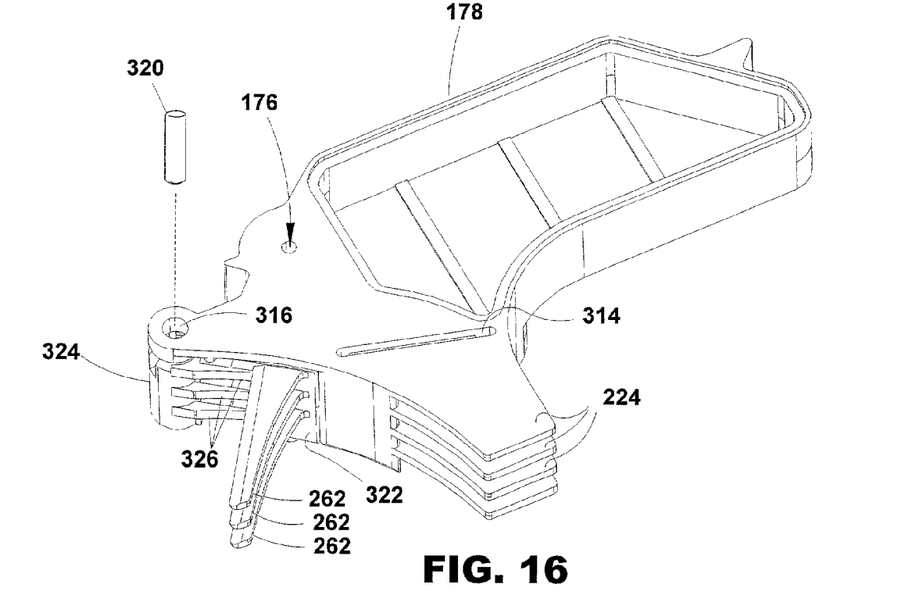
FIG. 16 is a perspective illustration of an embodiment of an assembly structure including a breather filter opened to a filter or flow passage for ambient air exchange as viewed from a first orientation.
Figure 17:
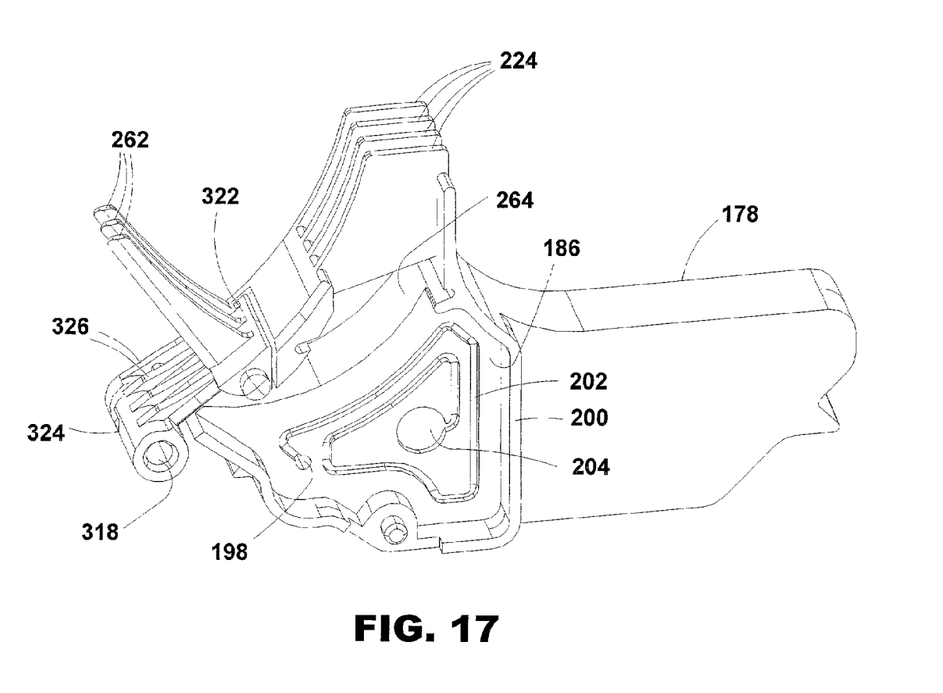
FIG. 17 is a perspective illustration of an embodiment of an assembly structure including a breather filter opened to a filter or flow passage for ambient air exchange as viewed from a second orientation.

FIGS. 16–17 illustrates an alternate embodiment of an assembly structure including a breather filter on the assembly body 310 having a second passage opened to an ambient exchange opening 176 and opened to the flow passage 264 to enhance breather filter efficiency as previously described. As illustrated in the embodiment of FIG. 13, the inlet to the flow passage 264 is positioned in a high pressure region upstream of the finger and the outlet 268 is positioned proximate to the low pressure region to provide a negative or low pressure relative to ambient opened to the ambient air exchange opening 176 to enhance breather filter efficiency and placement of the breather filter in the disc drive. The illustrated embodiment also includes a desiccant chamber portion 178 although application is not so limited. In the embodiment shown, flow plates 224 are supported in the filter passage 264 to provide a streamline or laminar flow therethrough.

Figure 18:
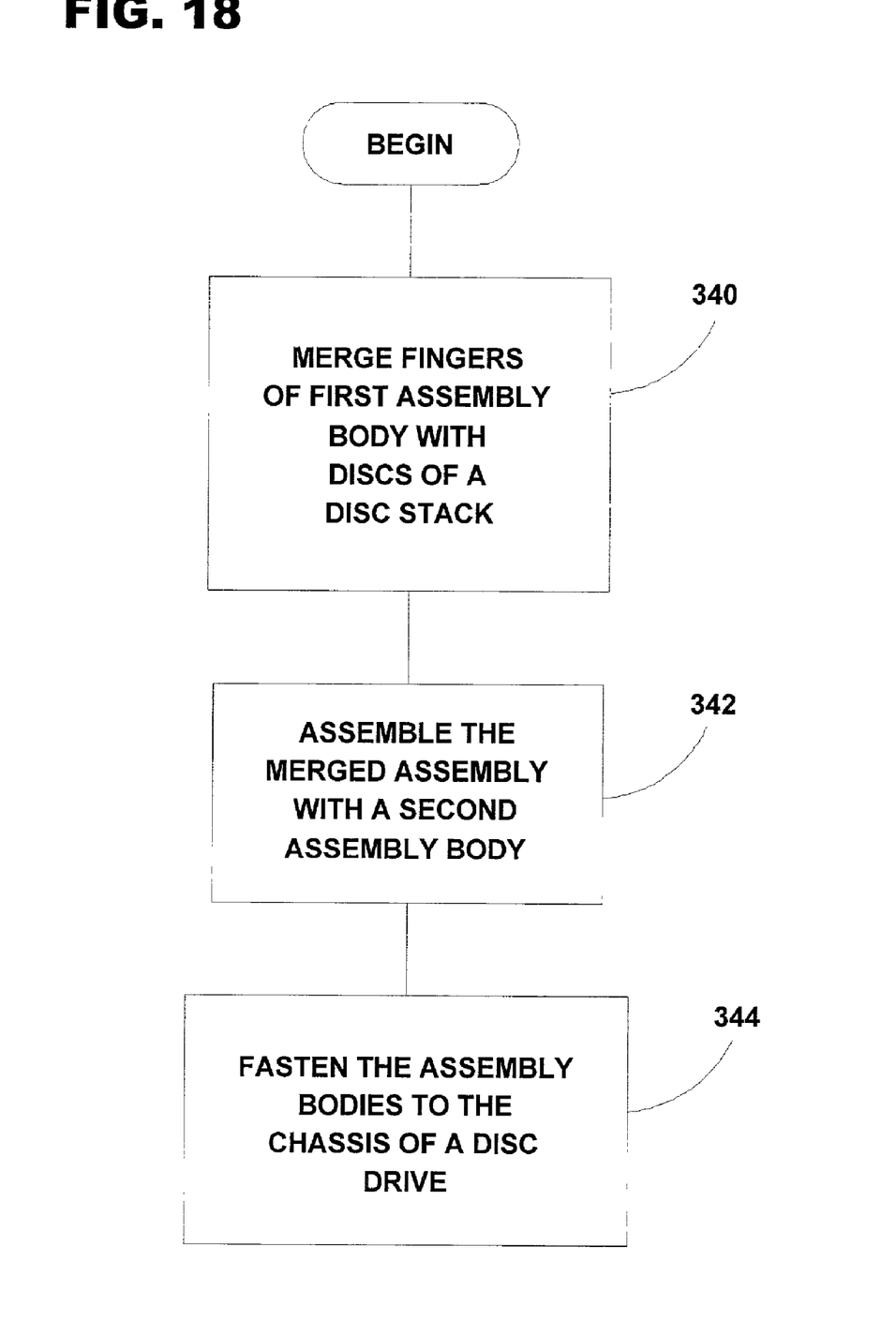
FIG. 18 is an assembly flow chart for an assembly embodiment.

FIG. 18 illustrates an assembly embodiment for assembling an assembly structure including multiple bodies including an air dam body and a filter body. As illustrated by block 340 for assembly, fingers of the first assembly body are merged with discs of a disc stack. Thereafter as illustrated by block 342, the merged assembly is assembled with the second assembly body. The assembly bodies are fastened to the chassis of a disc drive as illustrated by block 344.

A filter assembly for a data storage device. The filter assembly includes a flow passage (such as 154, 174, 222, 264) having an inlet (such as 156, 266) and outlet (such as 158, 268) to provide a recirculating filter. The filter assembly is positioned to provide a pressure differential between the inlet (such as 156,266) and outlet (such as 158,268) of the flow passage (such as 154,174, 222, 264). A breather filter includes an opening for ambient air exchange (such as 176) through a second flow passage (such as 162) which is opened to the flow passage of the recirculating filter to enhance ambient air exchange. An air dam assembly having fingers (such as 262) interposed in an air flow path provides a high pressure region and low pressure region. An assembly structure includes an air dam and a filter flow passage (such as 264) to enhance the pressure differential across the flow passage. Flow turbulence through the flow passage is reduced via flow plates (such as 224) supported between raised edge portions of the flow passage.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application system while maintaining substantially the same functionality without departing from the scope and spirit of the present invention. In addition, although the preferred embodiment described herein is directed to magnetic disc drive it will be appreciated by those skilled in the art that the teachings of the present invention can be applied to other systems such as an optical storage system, without departing from the scope and spirit of the present invention.

What is claimed is:

1. A filter assembly for a data storage device comprising:
   a first assembly body defining a first flow passage having an inlet and an outlet and a first flow passage length extending between the inlet and the outlet;
   a filter disposed in the first flow passage;
   a second flow passage in the first assembly body having an ambient exchange opening and an opening leading to an intermediate portion of the first flow passage between the inlet and the outlet;
   a filter portion interposed between the ambient exchange opening and the opening leading to the intermediate portion of the first flow passage; and
   a device for streamlining an air flow in the first flow passage.

2. The filter assembly of claim 1 further comprising an air dam coupleable to the first assembly body, in which the first flow passage length extends about the air dam.

3. The filter assembly of claim 2 further comprising a second assembly body including a plurality of spaced fingers extending therefrom to form the air dam, the plurality of spaced fingers extending from the filter assembly between the inlet and the outlet of the first flow passage.

4. The filter assembly of claim 3 wherein the second assembly body further comprises:
   a first body portion;
   a second body portion from which the plurality of fingers extends; and
   a plurality of spaced slats between the first and second body portions and offset relative to the plurality of fingers.

5. The filter assembly of claim 1 in which the first flow passage is curved along the first flow passage length.

6. The filter assembly of claim 1 in which the intermediate portion of the first flow passage has a smaller cross-section relative to the inlet.

7. The filter assembly of claim 1 in which the outlet includes raised edge portions.

8. The filter assembly of claim 1 wherein the device for streamlining the air flow in the first flow passage includes a plurality of flow plates therein.

9. The filter assembly of claim 1 wherein the first assembly body further includes a desiccant chamber.

10. A data storage device comprising:
    at least one disc rotationally coupled to a chassis and rotatable to provide an air flow;
    at least one head positionable proximate to the at least one disc to read or write data to the at least one disc;
    an assembly body defining a first flow passage having an inlet and an outlet and a first flow passage length extending between the inlet and the outlet, the inlet being adjacent the at least one disc;
    a filter disposed in the first flow passage;
    a second flow passage in the assembly body having an ambient exchange opening an opening leading to an intermediate portion of the first flow passage between the inlet and the outlet
    a filter portion interposed between the ambient exchange opening and the opening leading to the intermediate portion of the first flow passage; and
    an air dam coupled to the assembly body for managing the air flow such that the first flow passage length is curved about the air dam, wherein the air dam includes at least one finger disposed in a flow path of the at least one disc and creating a high pressure region upstream of the finger and a lower pressure region downstream of the finger, and in which the inlet is proximate to the high pressure region upstream of the finger and the outlet is proximate to the lower pressure region downstream of the finger.

11. The data storage device of claim 10 in which the first flow passage is disposed between the at least one disc and the second flow passage.

12. The data storage device of claim 10 in which the intermediate portion of the first flow passage has a smaller cross-section relative to the inlet.

13. The data storage device of claim 10 in which the outlet includes raised edge portions.

14. The data storage device of claim 10 wherein the device coupled to the assembly body for managing the airflow includes a plurality of flow plates.

15. The data storage device of claim 10 wherein the assembly body further includes a desiccant chamber.

16. A method for filtering air in a data storage device comprising steps of:
  providing a flow passage having an inlet proximate to a high pressure region of a disc and an outlet spaced therefrom;
  providing an ambient air exchange opened to the flow passage;
  providing a filter in the flow passage;
  providing a device for streamlining an airflow in the flow passage; and
  rotating the disc to create the high pressure region to induce the air flow through the flow passage and the ambient air exchange.

17. The method of claim 16 further comprising a step of providing an air dam interposed in a flow path to provide a high pressure region upstream of the air dam and a low pressure region downstream of the air dam.

18. A disc drive comprising:
  at least one disc rotationally coupled to a chassis and rotatable to provide an air flow;
  at least one head proximate to the disc to read or write data to the at least one disc;
  means for filtering and streamlining the air flow.

* * * * *